(12) United States Patent
Yajima et al.

(10) Patent No.: US 8,263,516 B2
(45) Date of Patent: Sep. 11, 2012

(54) METHOD FOR MANUFACTURING A STRUCTURE PROVIDED WITH DDR ZEOLITE MEMBRANE

(75) Inventors: Kenji Yajima, Nagoya (JP); Hisayoshi Nonaka, Nagoya (JP); Toshihiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 167 days.

(21) Appl. No.: 12/846,128

(22) Filed: Jul. 29, 2010

(65) Prior Publication Data

US 2010/0298115 A1 Nov. 25, 2010

Related U.S. Application Data

(63) Continuation of application No. PCT/JP2009/055219, filed on Mar. 11, 2009.

(30) Foreign Application Priority Data

Mar. 12, 2008 (JP) .................................. 2008-062868

(51) Int. Cl.
*B01J 29/06* (2006.01)
*B01J 39/00* (2006.01)

(52) U.S. Cl. .................. 502/4; 502/60; 502/62; 502/63; 502/64; 502/69

(58) Field of Classification Search .............. 502/4, 60, 502/62, 63, 64, 69
See application file for complete search history.

(56) References Cited

U.S. PATENT DOCUMENTS

| 2004/0173094 A1 | 9/2004 | Nakayama et al. |
| 2005/0229779 A1 | 10/2005 | Nakayama et al. |

FOREIGN PATENT DOCUMENTS

| JP | 2000-109690 A1 | 4/2000 |
| JP | 2003-159518 A1 | 6/2003 |
| JP | 2004-243246 A1 | 9/2004 |
| JP | 2007-050322 A1 | 3/2007 |
| WO | 03/024577 A1 | 3/2003 |

OTHER PUBLICATIONS

W.M. Meier, et al., "*Atlas of Zeolite Structure Types*," Fourth Edition, Elsevier, 1996.

*Primary Examiner* — Elizabeth Wood
(74) *Attorney, Agent, or Firm* — Burr & Brown (57) ABSTRACT

A method for manufacturing a DDR zeolite membrane element including the steps of: immersing a porous substrate in a raw material solution, forming a DDR zeolite membrane containing 1-adamanthanamine on a surface of the porous substrate by subjecting a DDR zeolite to hydrothermal synthesis in the presence of DDR zeolite seed crystals, applying a glass paste onto the surface of the porous substrate so as to contact the membrane, and heating the membrane at 500 to 800° C., thereby burning away the 1-adamanthanamine contained in the membrane and melting the glass paste to form a membrane-like glass seal contacting the membrane on the surface of the porous substrate. The method for manufacturing a DDR zeolite membrane element can inhibit the permeation of the DDR zeolite membrane from being hindered in a contact portion between the membrane and the glass seal and inhibit poor seal of the glass seal.

6 Claims, 6 Drawing Sheets

METHOD FOR MANUFACTURING A STRUCTURE PROVIDED WITH DDR ZEOLITE MEMBRANE

TECHNICAL OF THE INVENTION

The present invention relates to a method for manufacturing a DDR zeolite membrane element. More specifically, the present invention relates to a method capable of inhibiting the forming of DDR zeolite membrane from being hindered in a contact portion between the DDR zeolite membrane and the glass seal and inhibiting poor seal of the glass seal.

BACKGROUND OF THE INVENTION

Zeolite is used as a catalyst, a catalyst carrier, an adsorbing material, or the like. In addition, a zeolite membrane element where a membrane is formed on a surface of a porous substrate made of metal or ceramic has been used as a gas separation membrane or a pervaporation membrane by the use of the molecular sieving function of zeolite.

In zeolite, many kinds of crystal structure such as LTA, MFI, MOR, AFI, FER, FAU, DDR, and the like are present. Among them, DDR (Deca-Dodecasil 3R) is a crystal containing silica as the main component, and it is known that the pores are formed of a polyhedron containing an oxygen eight-membered ring and that the pore size of the oxygen eight-membered ring is 4.4×3.6 angstrom (see W. M. Meier, D. H. Olson, Ch. Baerlocher, Atlas of zeolite structure types, Elsevier (1996)).

The DDR zeolite has relatively small pore size among zeolite and has a possibility of application as a molecular sieve for low molecular gas such as carbon dioxide ($CO_2$), methane ($CH_4$), and ethane ($C_2H_6$).

In addition, as a method for manufacturing a DDR zeolite, there is disclosed a manufacturing method capable of manufacturing a dense DDR zeolite membrane in a short period of time by specifying the proportion of the contents of 1-adamanthanamine, silica, water, and ethylenediamine in the raw material solution (see, e.g., Patent Document 1). This method exhibits an excellent effect in being able to manufacture a dense DDR zeolite membrane in a short period of time.

A DDR zeolite membrane element, where a DDR zeolite membrane is formed on a surface of a porous substrate, may have a structure where a seal portion is formed by applying a seal material in a predetermined portion on a surface of the porous substrate to inhibit inflow and outflow of a target fluid from the seal portion.

Generally, as a sealing material of a zeolite membrane, a resin such as a silicone resin, a polyimide resin, or an epoxy resin, or a glass is used. Though it is required to change the material in accordance with the usage environment (temperature, pressure, atmosphere, and the like), in the case of using a membrane at relatively high temperature or in an atmosphere where it is exposed to an organic solvent, there have been proposed a method where a filler is mixed and a method where a mechanically sealing structure is employed (see, e.g., Patent Documents 2, 3).

Patent Document 1: JP-A-2003-159518
Patent Document 2: JP-A-2000-109690
Patent Document 3: JP-A-2007-50322

SUMMARY OF THE INVENTION

In a DDR zeolite membrane element having such a seal portion, in the case that the seal portion and the DDR zeolite membrane contact each other on a surface of the porous substrate, generally, air-tight or liquid-tight contact is necessary in the portion. The structure enables to inhibit inflow and outflow of the target fluid from the gap between the DDR zeolite membrane and the seal portion and enhance the separation performance of the DDR zeolite membrane element.

The method described in the Patent Document 2 uses a paste obtained by mixing an alumina powder as a filler with a polyimide resin as a seal material to manufacture a zeolite membrane having the seal material applied thereto. However, a polyimide resin may be deteriorated by swelling upon being exposed to steam, and there is a problem of complex operation steps because an alumina powder is used as the filler.

The method described in the Patent Document 3 uses a resin and dense ceramic or metal as the seal material to manufacture a zeolite membrane having the seal material applied thereto. However, many resins may be deteriorated by swelling or elution upon being exposed to steam or an organic solvent, and there is a problem of limited shapes for the porous substrate because of the complex structure.

As a method for manufacturing a DDR zeolite membrane element having a glass seal disposed thereon, there is a method where a glass seal is disposed in a predetermined position of a surface of a porous substrate, and the porous substrate having a glass seal disposed thereon is immersed in an alkali solution containing a predetermined raw material to form a DDR zeolite membrane on a surface of the porous substrate by hydrothermal synthesis. However, in this method, the glass seal disposed on the surface of the porous substrate sometimes elutes into the alkali solution, thereby causing a problem of generating poor seal or poor formation of the DDR zeolite membrane. The poor formation of the DDR zeolite membrane is caused by having a composition which is not suitable for forming the DDR zeolite membrane by the change of the raw material composition due to elution of a glass component into the raw material for forming the DDR zeolite membrane.

The present invention has been made in view of the problems of the prior art and aims to provide a method for manufacturing a DDR zeolite membrane element, the method being capable of inhibiting the formation of the DDR zeolite membrane from being hindered in a contact portion between the DDR zeolite membrane and the glass seal and inhibiting poor seal of the glass seal when the DDR zeolite membrane is disposed on a surface of the porous substrate so as to contact the glass seal.

In order to achieve the above aim, according to the present invention, the following method is provided for manufacturing a DDR zeolite membrane element.

According to a first aspect of the present invention, a method for manufacturing a DDR zeolite membrane element is provided, the method comprising the steps of: immersing a porous substrate in a raw material solution containing 1-adamanthanamine, silica, and water; forming a DDR zeolite membrane containing 1-adamanthanamine on a surface of the porous substrate by subjecting a DDR zeolite to hydrothermal synthesis in the presence of DDR zeolite seed crystals, applying a glass paste onto the surface of the porous substrate so as to contact the DDR zeolite membrane containing 1-adamanthanamine; and heating the DDR zeolite membrane at 500 to 800° C., thereby burning away the 1-adamanthanamine contained in the DDR zeolite membrane and melting the glass paste to form a membrane-like glass seal contacting the DDR zeolite membrane on the surface of the porous substrate to obtain a DDR zeolite membrane element comprising the porous substrate, the DDR zeolite membrane disposed on the surface of the porous substrate, and the glass seal disposed on the surface of the porous substrate so as to contact the DDR zeolite membrane.

According to a second aspect of the present invention, the method for manufacturing a DDR zeolite membrane element according to the first aspect is provided, wherein the method comprises the steps of: employing a columnar monolith-shaped substrate having a plurality of through-holes extending through in the central axial direction formed therein as the porous substrate, forming a DDR zeolite membrane containing 1-adamanthanamine on inner wall surfaces of the through-holes of the monolith-shaped substrate by immersing the monolith-shaped substrate in the raw material solution in a state that the DDR zeolite seed crystals are applied on the inner wall surfaces of the through-holes for hydrothermal synthesis, applying a glass paste onto both the end faces of the monolith-shaped substrate so as to contact the DDR zeolite membrane containing 1-adamanthanamine, and heating the DDR zeolite membrane at 500 to 800° C., thereby obtaining a DDR zeolite membrane element comprising the monolith-shaped substrate, the DDR zeolite membrane disposed on the inner wall surfaces of the through-holes of the monolith-shaped substrate, and the glass seal disposed on both the end faces of the monolith-shaped substrate so as to contact the DDR zeolite membrane.

According to a third aspect of the present invention, the method for manufacturing a DDR zeolite membrane element according to the second aspect is provided, wherein a glass paste is applied on both the end faces and on a side face in the ranges of 1 to 50 mm from each of the end faces of the monolith-shaped substrate so as to contact the DDR zeolite membrane containing 1-adamanthanamine.

According to a fourth aspect of the present invention, the method for manufacturing a DDR zeolite membrane element according to second to third aspects is provided, wherein a glass paste is applied on both the end faces and on the inner wall surfaces of the through-holes in the ranges of 1 to 50 mm from each of the end faces of the monolith-shaped substrate so as to contact the DDR zeolite membrane containing 1-adamanthanamine.

According to a fifth aspect of the present invention, a DDR zeolite membrane element is provided, comprising a porous substrate, a DDR zeolite membrane disposed on a surface of the porous substrate, and a glass seal disposed on a surface of the porous substrate so that a part of the glass seal overlaps the surface of the DDR zeolite membrane.

Thus, according to a method for manufacturing a DDR zeolite membrane element of the present invention, a DDR zeolite membrane element having a glass seal applied thereon is obtained by forming a DDR zeolite membrane containing 1-adamanthanamine on a surface of the porous substrate, applying a glass paste onto the surface of the porous substrate so as to contact the DDR zeolite membrane containing 1-adamanthanamine, and heating the DDR zeolite membrane at 500 to 800° C., thereby burning away the 1-adamanthanamine contained in the DDR zeolite membrane and melting the glass paste to form a membrane-like glass seal contacting the DDR zeolite membrane on the surface of the porous substrate. Therefore, a DDR zeolite membrane element can be manufactured without immersing a glass seal in an alkali solution to be able to inhibit formation of the DDR zeolite membrane from being hindered and inhibit generation of poor seal of the glass seal.

DESCRIPTION OF REFERENCE NUMERALS USED IN THE DRAWINGS

1: porous substrate; 2: through-holes; 3: side face; 4: end face; inner wall surface of through-hole; 11: DDR zeolite membrane containing 1-adamanthanamine; 12: DDR zeolite membrane; 21: glass seal; 22: side face seal portion; 23: seal portion in through-hole; 31a, 31b: glass seal; 32: DDR zeolite membrane; 33: DDR zeolite crystal; 34: monolith-shaped substrate; 100, 200: DDR zeolite membrane element; S1, S2: region.

DETAILED DESCRIPTION OF THE INVENTION

Next, embodiments of the present invention will be described in detail with referring to drawings. However, the present invention is not limited to the following embodiments, and it should be understood that changes, improvements, and the like of the design may suitably be made on the basis of ordinary knowledge of a person of ordinary skill in the range of not deviating from the gist of the present invention. In addition, the elements having the same reference numeral in each drawing show the same constituent.

An embodiment of a method for manufacturing a zeolite membrane element of the present invention is a method for obtaining a DDR zeolite membrane element, where, in the first place, a porous substrate is immersed in a raw material solution containing 1-adamanthanamine, silica, and water on the surface of the porous substrate to form a "DDR zeolite membrane containing 1-adamanthanamine" on a surface of the porous substrate by hydrothermal synthesis in the presence of DDR zeolite seed crystals, a glass paste is applied onto the surface of the porous substrate so as to contact the "DDR zeolite membrane containing 1-adamanthanamine", and the DDR zeolite membrane is heated at 500 to 800° C., thereby burning away the 1-adamanthanamine contained in the DDR zeolite membrane and melting the glass paste to form a membrane-like glass seal contacting the DDR zeolite membrane on the surface of the porous substrate. The DDR zeolite membrane element contains the porous substrate, the DDR zeolite membrane disposed on the surface of the porous substrate, and the glass seal disposed on the surface of the porous substrate so as to contact the DDR zeolite membrane.

(Porous Substrate)

The shape of the porous substrate used in a method for manufacturing the zeolite membrane element of the present embodiment is not particularly limited, and an arbitrary shape may be employed in accordance with the use. Suitable examples include a plate-like shape, a cylindrical shape, a honeycomb shape, and a monolith shape. Of these, a monolith shape is preferable because a membrane area per unit volume can be made large and because a seal portion area per membrane area can be made small. Incidentally, the "monolith shape" in the present embodiment means a columnar shape having a plurality of through-holes extending through in the central axial direction formed therein and, for example, a shape having a lotus-like cross section perpendicular to the central axial direction. Hereinbelow, the case that the porous substrate has the aforementioned monolith shape (substrate having a monolith shape) will be described. However, the shape of the porous substrate is not limited to the shape as described above.

Figure 1:
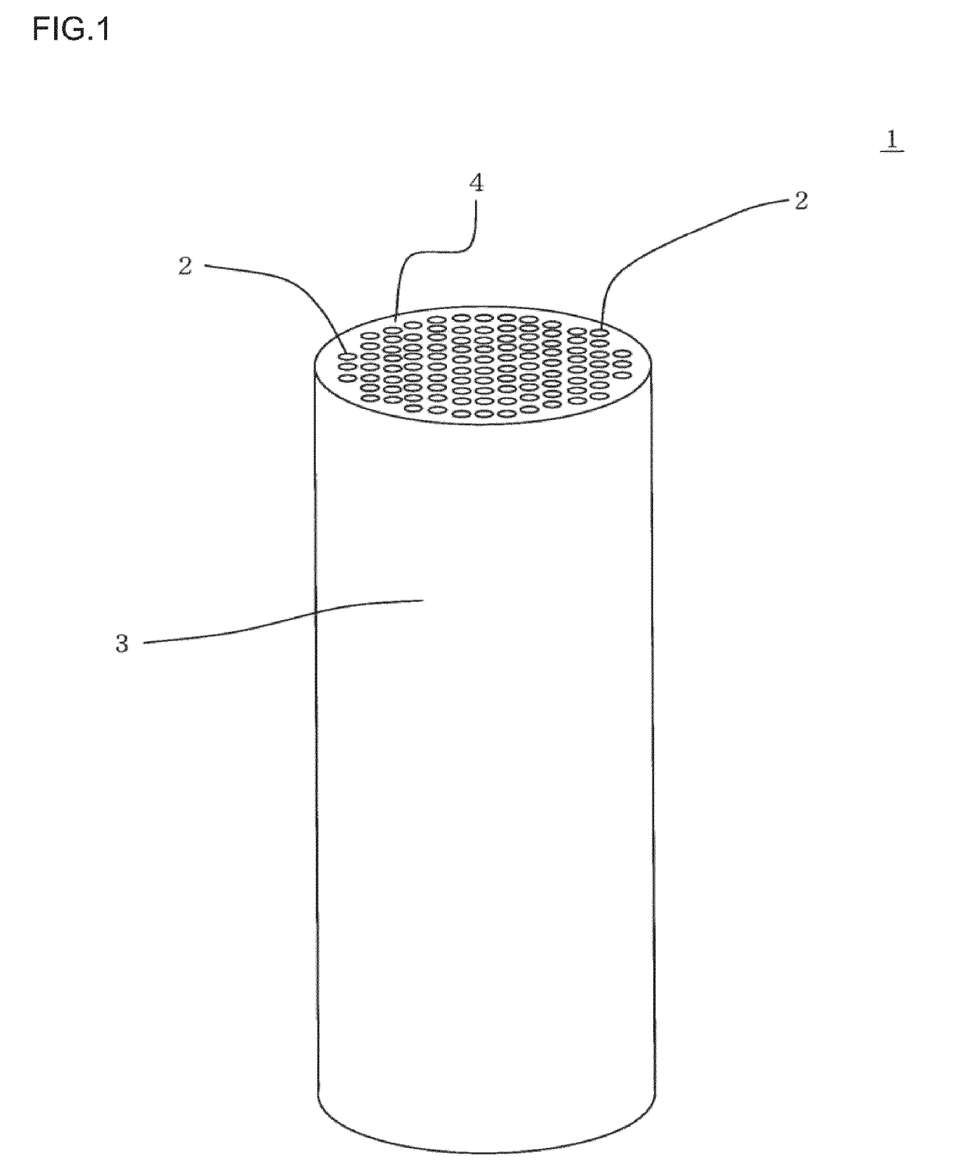
FIG. 1 is a perspective view schematically showing a porous substrate used in an embodiment of a method for manufacturing a DDR zeolite membrane element of the present invention.

FIG. 1 is a perspective view schematically showing a porous substrate 1 used in a method for manufacturing a DDR zeolite membrane element of the present embodiment. The porous substrate 1 is a circular columnar substrate having a monolith shape where a plurality of through-holes 2 extending through in the central axial direction are formed. The average porosity of the porous substrate 1 is preferably 10 to 60%, more preferably 20 to 40%. When it is below 10%, pressure loss may be large upon separation of the target fluid, while, when it is above 60%, strength of the porous substrate 1 may be low. Incidentally, the average porosity is a value measured with a mercury porosimeter. The porous substrate 1 has a plurality of particle layers, and the average pore size of the outermost surface layer facing the through-hole 2 is preferably 0.003 to 10 µm, more preferably 0.01 to 1 µm. When it is smaller than 0.003 µm, the pressure loss may be large upon separation of the target fluid, while, when it is larger than 10 µm, a defect may easily be caused in a DDR zeolite membrane formed on a surface. The length of the porous substrate and the area of the cross section perpendicular to the axial direction can suitably be determined in accordance with the purpose. For example, a porous substrate having a length of about 40 to 1000 mm can suitably be used. Preferable materials for the porous substrate 1 include ceramics such as alumina, zirconia, and mullite, glass, zeolite, clay, metal, and carbon. Of these, alumina is preferable in that it is excellent in strength and low cost.

The density (number of through-holes/cross-sectional area perpendicular to the central axial direction of the porous substrate) of the through-holes 2 formed in the porous substrate 1 is preferably 0.01 to 15 through-holes/cm$^2$. When it is less than 0.01 through-holes/cm$^2$, the treatment performance upon separation of the target fluid may fall, while, when it is more than 15 through-holes/cm$^2$, strength of the porous substrate may decrease. It is preferable that each of the through-holes has an area of 0.5 to 28 mm$^2$ of a cross section perpendicular to the central axis. When it is smaller than 0.5 mm$^2$, the pressure loss upon separation of the target fluid may be large, while, when it is larger than 28 mm$^2$, strength of the porous substrate may decrease, or the treatment performance upon separation of the target fluid may fall.

There is no particular limitation on the method for manufacturing a porous substrate, and a known method may be employed.

(Raw Material Solution)

A raw material solution containing 1-adamanthanamine, silica, and water is prepared. In the present embodiment, 1-adamanthanamine is used as a structure-directing agent for forming a DDR zeolite membrane. In the first place, a raw material solution is prepared by mixing 1-adamanthanamine with silica, water, and as necessary ethylenediamine, and other additives. As the silica, silica sol is preferably used. For example, when a minute amount of sodium aluminate is used as an additive, a part of Si constituting the DDR zeolite membrane can be replaced with Al. Such replacement enables to add catalysis and the like to a DDR zeolite membrane to be formed in addition to a separation function. Upon preparing the raw material solution, the ratio of 1-adamanthanamine to silica (1-adamanthanamine/silica (molar ratio)) is preferably 0.002 to 0.5, more preferably 0.002 to 0.2. When it is below 0.002, 1-adamanthanamine as a structure-directing agent is insufficient to sometimes make formation of the DDR zeolite difficult, while, when it is above 0.5, it is hard to form the DDR zeolite in a membrane shape, and it leads to increase in production costs because the amount of expensive 1-adamanthanamine to be used increases. The ratio of water to silica (water/silica (molar ratio)) is preferably 10 to 500, more preferably 10 to 200. When it is below 10, silica concentration is too high, thereby making formation of DDR zeolite difficult, and, even if DDR zeolite is formed, it is sometimes difficult to make it into a membrane shape. When it is larger than 500, the silica concentration is too low, and it may be difficult to form the DDR zeolite.

It is preferable that the raw material solution contain ethylenediamine. By preparing a raw material solution with adding ethylenediamine thereto, 1-adamanthanamine can be dissolved easily, thereby enabling to manufacture a dense DDR zeolite membrane having a uniform crystal size and membrane thickness. The ratio of ethylenediamine to 1-adamanthanamine (ethylenediamine/1-adamanthanamine (molar ratio)) is preferably 4 to 35, more preferably 8 to 32. When it is below 4, it is insufficient for making the dissolution of 1-adamanthanamine easy, while, when it is above 35, the production cost may be high because of excessive ethylenediamine which does not contribute to the reaction.

In addition, it is preferable to prepare a 1-adamanthanamine solution by dissolving 1-adamanthanamine with ethylenediamine in advance. It is preferable to use the raw material solution prepared by mixing the 1-adamanthanamine solution thus prepared with a silica sol solution containing silica because 1-adamanthanamine can be dissolved more simply and completely to be able to manufacture a dense DDR zeolite membrane having a uniform crystal size and membrane thickness. Incidentally, though the silica sol solution can be prepared by dissolving a minutely powdered silica with water or by subjecting alkoxide to hydrolysis, a commercially available silica sol can be used by adjusting the silica concentration.

(Hydrothermal Synthesis)

The porous substrate is immersed in the raw material solution to form a "DDR zeolite membrane containing 1-adamanthanamine" on a surface of the porous substrate by hydrothermal synthesis in the presence of DDR zeolite seed crystals. Here, the "presence of seed crystals" means that the seed crystals are present so as to contact a surface of the porous substrate upon hydrothermal synthesis. Therefore, a porous substrate may be immersed in a raw material solution where seed crystals are dispersed in advance to perform hydrothermal synthesis, or a porous substrate having seed crystals applied in advance onto a surface thereof may be immersed in a raw material solution to perform hydrothermal synthesis. Alternatively, it is possible to apply seed crystals onto a surface of the porous substrate in addition to dispersing seed crystals in the raw material solution in advance, followed by immersing the porous substrate in the raw material solution for hydrothermal synthesis. From the viewpoint of disposing the seed crystals uniformly on the surface of the porous substrate, it is preferable to apply the seed crystals on the surface of the porous substrate in advance.

As the seed crystals, it is preferable to use a fine powder obtained by pulverizing a DDR zeolite powder manufactured in accordance with the method for manufacturing a DDR zeolite described in "M. J. denExter, J. C. Jansen, H. van Bekkum, Studies in Surface Science and Catalysis vol. 84, Ed. by J. Weitkamp et al., Elsevier (1994) 1159-1166". It is preferable to allow the seed crystals after pulverization to have a predetermined particle diameter range by the use of a sieve or the like.

In addition, in the case of dispersing the seed crystals in a raw material solution, a predetermined amount of the aforementioned predetermined seed crystals are added upon preparing the raw material solution. Though a general agitation method may be employed as the method for dispersing the seed crystals in the raw material solution, a method such as an ultrasonic wave treatment may be employed, and the uniform dispersion enables to form a dense DDR zeolite membrane having a uniform membrane thickness. Incidentally, in the case of subjecting the DDR zeolite membrane to hydrothermal synthesis by the use of a raw material solution where the seed crystals are dispersed, masking with a PTFE (polytetrafluoroethylene) seal tape or the like may be performed in a portion where no DDR zeolite membrane is formed on the surface of the porous substrate lest the DDR zeolite membrane should be formed there.

There is no particular limitation on a method for immersing the porous substrate in a raw material solution for hydrothermal synthesis of DDR zeolite. For example, in the case of applying the seed crystals onto a surface of the porous substrate, the following method may be employed.

Figure 2:
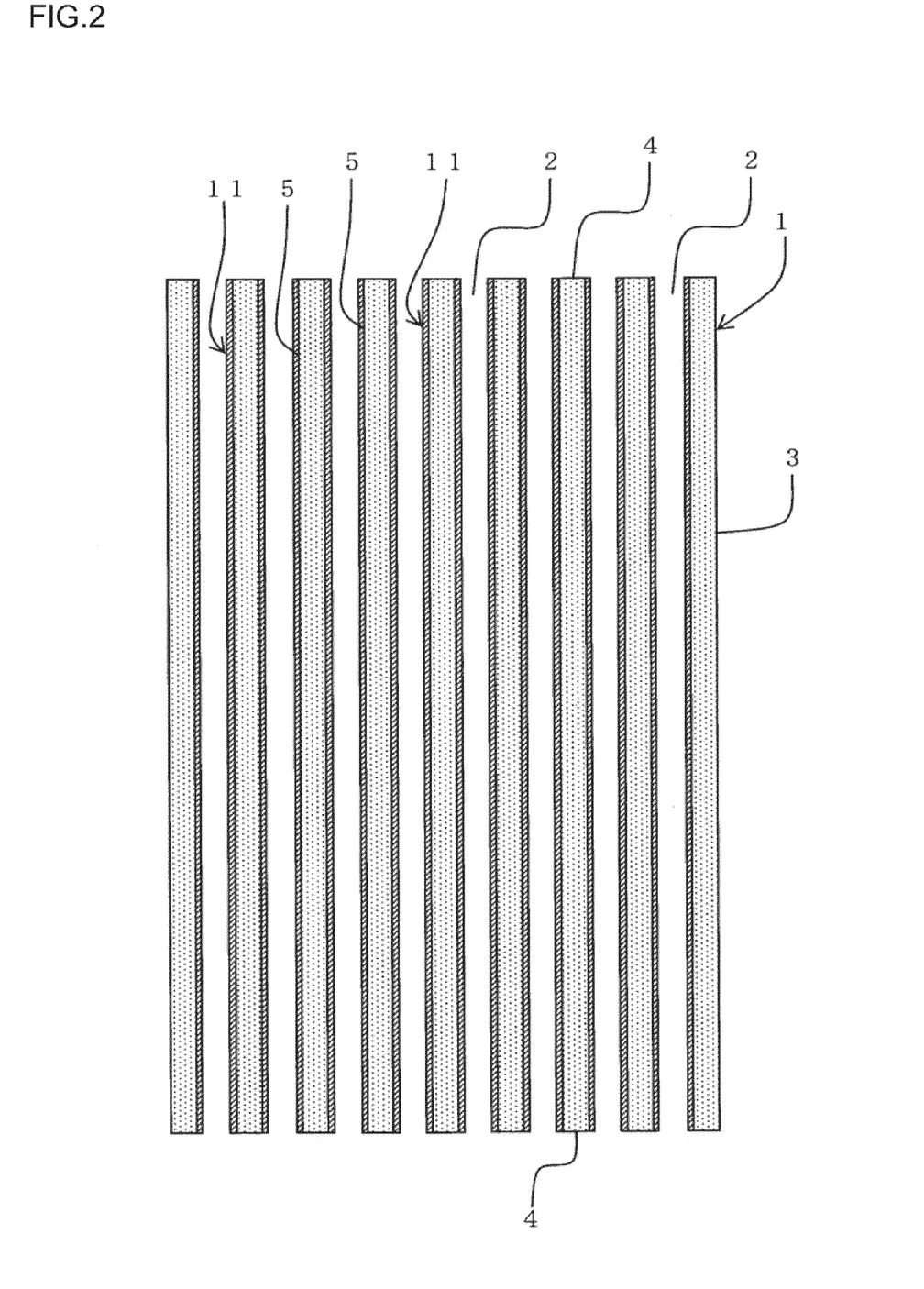
FIG. 2 is a schematic view showing a cross section taken along a plane in parallel with the central axis of the porous substrate having a DDR zeolite membrane disposed thereon after hydrothermal synthesis in an embodiment of a method for manufacturing a DDR zeolite membrane element of the present invention.

Seed crystals dispersion solution is applied onto the inner wall surfaces of the through-holes of the porous substrate to form a porous substrate having seed crystals applied on the inner wall surfaces of the through-holes by dip coating, filtration coating and so on. Then, the porous substrate having the seed crystals applied thereon is put in a pressure tight container or the like containing a raw material solution and kept at the predetermined temperature described below for a predetermined period of time for hydrothermal synthesis to form a DDR zeolite membrane containing 1-adamanthanamine 11 on the inner wall surfaces 5 of the through-holes 2 of the porous substrate 1 as shown in FIG. 2. In this case, on the side face 3 and both the end faces 4, 4 of the porous substrate 1 that seed crystals are not applied on, no DDR zeolite membrane is formed. As shown in FIG. 2, it is preferable that the DDR zeolite membrane containing 1-adamanthanamine 11 is disposed on the inner wall surfaces of the through-holes over the portion between both the end portions. That is, it is preferable that it is disposed on the entire inner wall surfaces of the through-holes. In the present embodiment, the temperature condition upon hydrothermal synthesis is preferably 90 to 200° C., more preferable 100 to 150° C. In the case of hydrothermal synthesis at temperature lower than 90° C., it may be difficult to form a DDR zeolite membrane, while, in the case of hydrothermal synthesis at temperature higher than 200° C., a crystal phase different from that of the DDR zeolite, for example, DOH zeolite may be formed. The treatment time upon hydrothermal synthesis is preferably 1 to 240 hours, more preferably 1 to 120 hours. FIG. 2 is a schematic view showing a cross section taken along a plane in parallel with the central axis of the porous substrate having a DDR zeolite membrane disposed thereon after hydrothermal synthesis in the method for manufacturing a DDR zeolite membrane element of the present embodiment.

The thickness of the DDR zeolite membrane containing 1-adamanthanamine 11 and formed on the inner wall surfaces of the through-holes of the porous substrate is preferably 0.05 to 15 µm, more preferably 0.1 to 5 µm, particularly preferably 0.1 to 2 µm. When it is larger than 15 µm, the gas permeation amount may decrease. When it is smaller than 0.05 µm, strength of the DDR zeolite membrane may decrease. Here, when a membrane is formed on the surface of the porous substrate, there is a case of forming a membrane having portions which enter pores of the porous substrate besides the surface of the porous substrate because a large number of pores are open on the surface of the porous substrate. The "membrane thickness" of the present embodiment means thickness including the portions which thus enter pores of the porous substrate. In addition, the membrane thickness of the DDR zeolite is the average value of the values measured with an electron micrograph in five positions in a cross section taken along the thickness direction.

(Application of Glass Paste)

Next, a glass paste is applied on a surface of the porous substrate so as to contact the DDR zeolite membrane containing 1-adamanthanamine. There is no particular limitation on the portion where the glass paste is applied, and it is preferable to apply the glass paste to a portion trying to inhibit gas, liquid, fine particles and the like from moving from the inside of the porous substrate to the outside portion or from the outside portion to the inside of the porous substrate in the surface of the porous substrate. In the present embodiment, the glass paste is applied on both the end faces of the porous substrate (monolith-shaped substrate). At this time, it is preferable not to form a gap in a contact portion between the DDR zeolite membrane containing 1-adamanthanamin and formed on the inner wall surfaces of the through-holes and the glass paste applied on both the end faces, and it is further preferable to form the contact portion in such a manner that a part of the glass paste overlaps the surface of the DDR zeolite membrane containing 1-adamanthanamine.

The glass material applied on the surface of the porous substrate as the glass paste has a softening point of preferably 400 to 800° C., more preferably 450 to 750° C. When it is lower than 400° C., the temperature for melting the glass paste is below 500° C., where the simultaneous combustion removal of 1-adamanthanamine may be impossible. When it is above 800° C., temperature for melting the glass paste is above 800° C., where a defect may easily be caused in the DDR zeolite membrane. The glass paste can be manufactured by dispersing a powdered glass in a solvent such as water. In addition, it is preferable that the manufacturing may be performed by adding a polymer or the like to the solvent such as water. In addition, the thermal expansion coefficient of the glass material is close to that of the porous substrate. For example, in the case of an alumina porous substrate, since the thermal expansion coefficient of alumina is about $7 \times 10^{-6} [K^{-1}]$, the thermal expansion coefficient of the glass material is preferably 5 to $8 \times 10^{-6} [K^{-1}]$. In addition, though there is no particular limitation on the composition system of the glass material, it preferably satisfies the aforementioned softening point and thermal expansion coefficient, and a system containing no PbO (lead oxide) is furthermore preferable.

Examples of the composition system include a $Na_2O$—$ZnO$—$B_2O_3$ system, a $Na_2O$—$B_2O_3$—$SiO_2$ system, and $CaO$—$BaO$—$SiO_2$ system. Though there is no particular limitation on the average particle diameter of the powdered glass, it is preferably 0.1 to 150 μm, more preferably 1 to 30 μm.

(Formation of DDR Zeolite Membrane Element)

Figure 3:
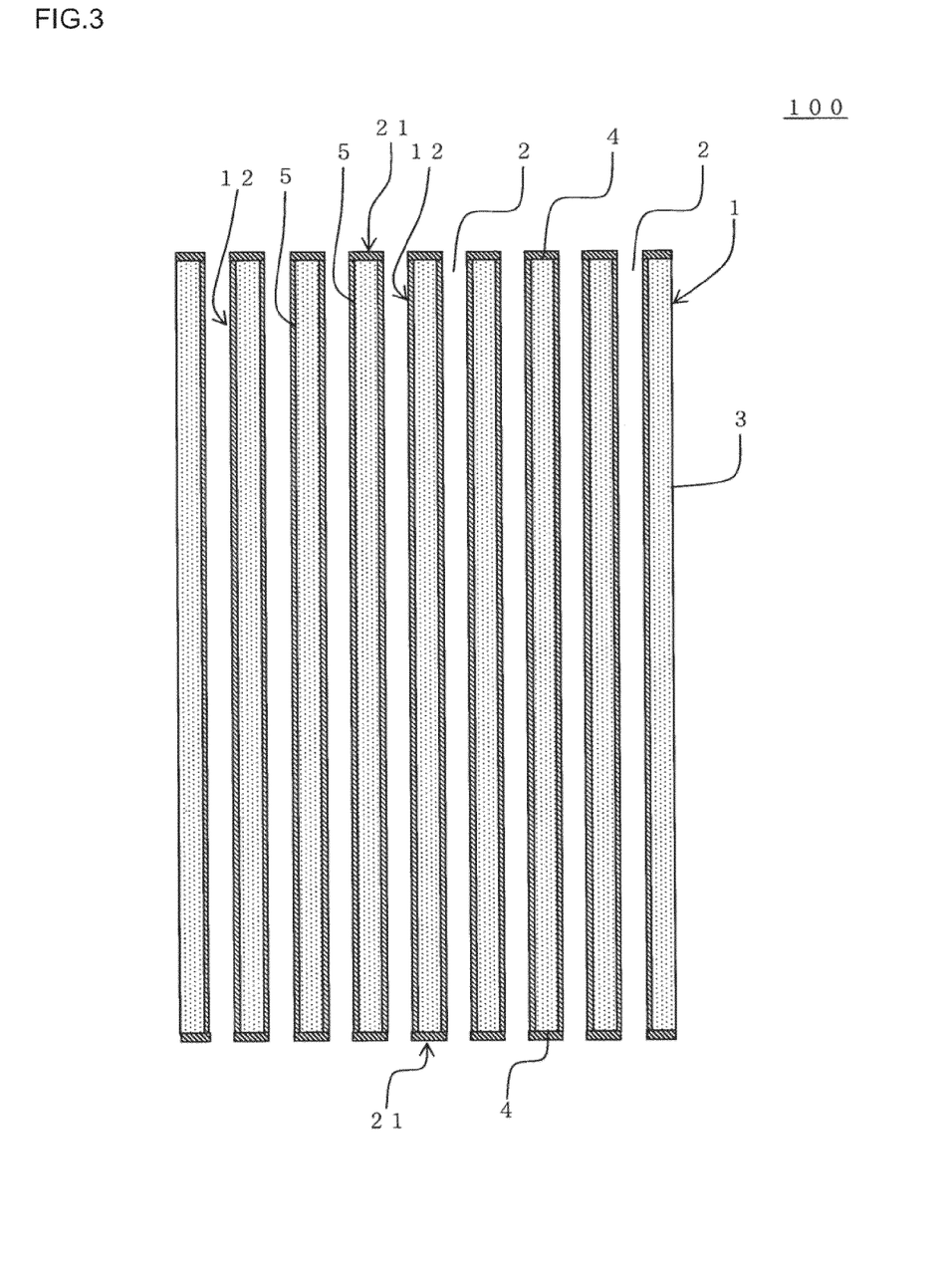
FIG. 3 is a schematic view showing a cross section taken along a plane in parallel with the central axis of the DDR zeolite membrane element obtained by an embodiment of a method for manufacturing a DDR zeolite membrane element of the present invention.

Next, the porous substrate 1 where the DDR zeolite membrane containing 1-adamanthanamine is disposed on the inner wall surfaces 5 of the through-holes 2 and where the glass paste is applied on both the end faces 4, 4 so as to contact the DDR zeolite membrane with no gap is heated at 500 to 800° C. to burn away the 1-adamanthanamine and melt the glass paste to form a membrane-like glass seal contacting the DDR zeolite membrane on the surface (both the end faces) of the porous substrate to obtain a DDR zeolite membrane element 100 as shown in FIG. 3. FIG. 3 is a schematic view showing a cross section taken along a plane in parallel with the central axis of the DDR zeolite membrane element obtained by the method for manufacturing a DDR zeolite membrane element of the present embodiment. The DDR zeolite membrane element 100 obtained is a DDR zeolite membrane element 100 comprising the porous substrate 1, the DDR zeolite membrane 12 disposed on the surface of the porous substrate 1, and the glass seal 21 disposed on the surface of the porous substrate 1 so as to contact the DDR zeolite membrane 12. It is more preferable that the DDR zeolite membrane element contains the porous substrate, the DDR zeolite membrane disposed on the surface of the porous substrate, and the glass seal disposed on the surface of the porous substrate so that a part overlaps the surface of the DDR zeolite membrane.

Since, in the method for manufacturing a DDR zeolite membrane element of the present embodiment, the heating for forming a glass seal from the glass paste and the heating for burning away 1-adamanthanamine from the DDR zeolite membrane containing 1-adamanthanamine are simultaneously performed, the method can inhibit generation of poor seal due to dissolution of the glass seal in an alkali solution because the glass seal is not immersed in an alkali raw material solution. Further, since there is no case that a glass component elutes in the raw material for forming a DDR zeolite membrane to change the raw material composition and give a composition which is not suitable for formation of the DDR zeolite membrane, the method can inhibit the formation of the DDR zeolite membrane from being hindered. Therefore, by the method for manufacturing the DDR zeolite membrane element of the present embodiment, the contact portion between the DDR zeolite membrane formed on the inner wall surfaces of the through-holes of the porous substrate and the glass paste disposed on both the end faces of the porous substrate can be formed air-tightly and liquid-tightly lest gas, liquid, fine particles, or the like should leak out from the contact portion or enter from the contact portion. That is, it is possible to inhibit a gap from being formed in the contact portion between the DDR zeolite membrane containing 1-adamanthanamine and the glass paste.

The temperature for heating the porous substrate 1 where the DDR zeolite membrane containing 1-adamanthanamine is disposed on the inner wall surfaces 5 of the through-holes 2 and where the glass paste is applied on both the end faces 4, 4 is 500 to 800° C., more preferably 550 to 800° C. When it is below 500° C., it may become hard to burn away 1-adamanthanamine, while, when it is above 800° C., a defect may easily be caused in the DDR zeolite membrane. The atmosphere upon heating is preferably the air. Though there is no particular limitation on the heating apparatus, an electric furnace as an example may be employed.

Another Embodiment

Figure 4:
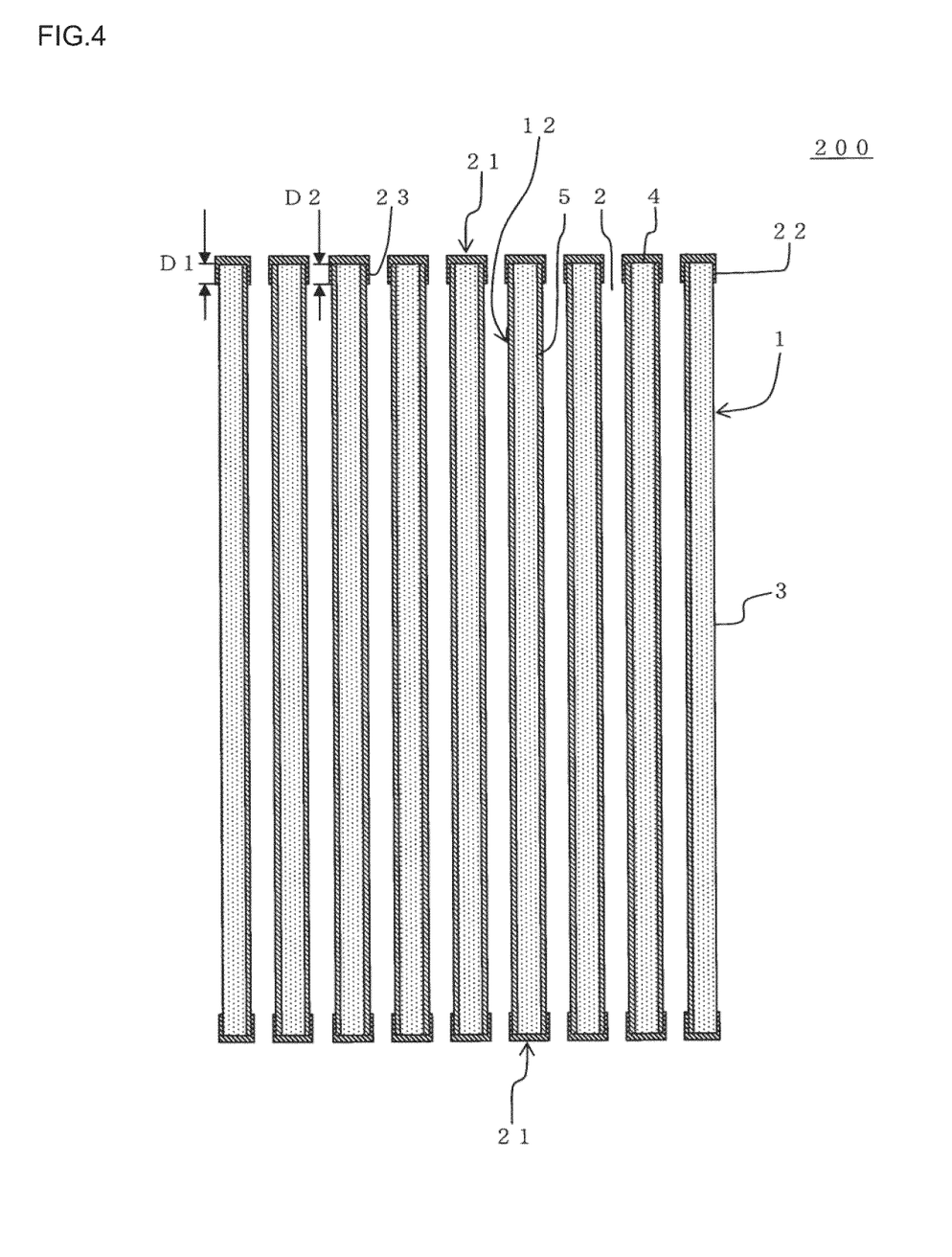
FIG. 4 is a schematic view showing a cross section taken along a plane in parallel with the central axis of the DDR zeolite membrane element obtained by another embodiment of a method for manufacturing a DDR zeolite membrane element of the present invention.

FIG. 4 is a schematic view showing a cross section taken along a plane in parallel with the central axis of the DDR zeolite membrane element 200 obtained by another embodiment of a method for manufacturing a DDR zeolite membrane element of the present invention. The method for manufacturing a DDR zeolite membrane element of the present embodiment employs a method of "applying the glass paste" which is different from that of the aforementioned embodiment of a method for manufacturing a DDR zeolite membrane element of the present invention, and the other steps are the same. In addition, since the method of "applying the glass paste" of the method for manufacturing a DDR zeolite membrane element of the present embodiment is different from that of the aforementioned embodiment of a method for manufacturing a DDR zeolite membrane element of the present invention, the shape of the glass seal disposed is different from that of the DDR zeolite membrane element obtained in the aforementioned embodiment of a method for manufacturing a DDR zeolite membrane element of the present invention.

(Application of Glass Paste)

The glass paste is applied on a surface of the porous substrate so as to contact the DDR zeolite membrane containing 1-adamanthanamine. In the present embodiment, the glass paste is applied on both the end faces 4, 4 of the porous substrate (monolith-shaped substrate) 1 and in the range of 1 to 50 mm from each of both the end faces 4, 4 of the porous substrate in the side face 3 so as to contact the DDR zeolite membrane containing 1-adamanthanamine and further applied on both the end faces 4, 4 of the monolith-shaped substrate 1 and in the range of 1 to 50 mm from each of both the end faces 4, 4 of the porous substrate on the inner wall surfaces 5 of the through-holes 2 so as to contact the DDR zeolite membrane containing 1-adamanthanamine. By this, as shown in FIG. 4, the resultant DDR zeolite membrane element 200 has a side face seal portion 22 in the range of 1 to 50 mm from each of both the end faces 4, 4 of the porous substrate in the side face 3 and contains a glass seal 21 having a seal portion 23 inside the through-holes in the range of 1 to 50 mm from each of both the end faces 4, 4 of the porous substrate. Therefore, it has portions where the glass seal 21 is disposed on the end faces 4 of the monolith-shaped substrate, the side face seal portions 22 formed unitarily with the portions disposed on the end faces 4, and the seal portions 23 inside the through-holes. Since it is preferable that the seal portions 23 inside the through-holes are disposed so as to be laminated on the DDR zeolite membrane disposed inside the through-holes as shown in FIG. 4, even when the glass paste is applied inside the through-holes, it is preferable to apply the glass paste on the surface of the DDR zeolite membrane containing 1-adamanthanamine. Incidentally, though it is preferable to provide both the side face seal portion 22 and the seal portion 23 inside the through-hole as in the present embodiment, only one of them may be provided.

Thus, since the glass seal 21 has a side face seal portion 22, the sealability in the end face portion of the monolith-shaped substrate can further be improved. In addition, since the glass seal 21 has the seal portion 23 inside the through-hole, the sealability in the contact portion with the DDR zeolite membrane can further be improved.

The length D1 in the central axial direction of the side face seal portion 22 is in the range of preferably 1 to 50 mm as described above, more preferably 5 to 20 mm. When the length D1 in the central axial direction of the side face seal portion 22 is below 1 mm (when the side face seal portion 22 is formed in the range shorter than the range from the end face 4 to 1 mm of the porous substrate in the side face 3), it may be difficult to secure sealability. When it is above 50 mm, the area of the side face of the monolith-shaped substrate becomes small, and the circulation of the fluid may be hindered. In addition, the length D2 in the central axial direction of the seal portion 23 inside the through-hole is in the range of preferably 1 to 50 mm as described above, more preferably 1 to 20 mm. When the length D2 in the central axial direction of the seal portion 23 inside the through-hole is below 1 mm (when the seal portion 23 inside the through-hole is formed in the range shorter than the range from the end face 4 to 1 mm of the porous substrate in the through-hole 2), it may become difficult to secure the sealability. When it is above 50 mm, the area of the DDR zeolite membrane becomes small, and the separation efficiency may be decreased. Therefore, when the glass paste is applied inside the through-holes and on the side face of the monolith-shaped substrate, it is preferable to apply the glass paste on the position where the aforementioned side face seal portion 22 and the seal portion 23 in the through-hole are disposed.

The other conditions for application of the glass paste is preferably similar to those for "application of the glass paste" in the aforementioned embodiment of a method for manufacturing a DDR zeolite membrane element of the present invention.

(DDR Zeolite Membrane Element)

A DDR zeolite membrane element of the present invention contains a porous substrate, a DDR zeolite membrane disposed on a surface of the porous substrate and a glass seal disposed on the surface of the porous substrate so that a part of the glass seal overlaps the surface of the DDR zeolite membrane. In the case that a zeolite membrane is formed on a surface of the porous substrate, the zeolite membrane is not only formed on the surface of the porous substrate, but also enters the inside of the substrate to be formed. At that time, since the zeolite membrane is formed so as to wraparound the particles constituting the porous substrate, physical adhesion strength is imparted to the gap between the zeolite membrane and the substrate besides adhesion strength due to the chemical bonding of zeolite to the substrate particles, thereby enhancing the adhesion strength between the zeolite membrane and the porous substrate to obtain a zeolite membrane which is hardly peeled off. On the other hand, in the case that a glass seal or the like is densely formed on a part of the surface of the porous substrate and that a zeolite membrane is formed on the surface in the dense portion, the adhesion strength due to the chemical bonding between zeolite and the material (e.g., glass) constituting the dense portion is dominant in the zeolite membrane formed on the surface of the dense portion, and almost no physical adhesion strength is generated between the zeolite membrane and the substrate. Therefore, the zeolite membrane formed on the surface of the portion where the glass seal or the like are densely formed is easily peeled off. In the case that the zeolite membrane is peeled off from the surface of the glass seal, a part may be peeled off also in a portion where a zeolite membrane is formed on the surface of the porous substrate, or a crack or the like may be caused to make securement of the aimed separation performance difficult. Therefore, in the case of disposing the glass seal and the DDR zeolite membrane on the surface of the porous substrate so that a part of each of them overlaps each other, it is necessary that the DDR zeolite membrane and the glass seal are disposed so that the glass seal overlaps the DDR zeolite membrane from above as in a DDR zeolite membrane element of the present invention. This makes the DDR zeolite membrane of the DDR zeolite membrane element have high adhesion strength with porous substrate and hardly peeled off.

A DDR zeolite membrane element of the present invention can be manufactured by forming a contact portion between the DDR zeolite membrane and the glass seal so that a part of the glass seal overlaps the surface of the DDR zeolite membrane by using the aforementioned method for manufacturing a DDR zeolite membrane element of the present invention. Therefore, the DDR zeolite membrane element obtained by the aforementioned other embodiment of a method for manufacturing a DDR zeolite membrane element of the present invention is a DDR zeolite membrane element of the present invention. Each constituent and properties of a DDR zeolite membrane element of the present invention are the same as those of the embodiment where "the glass seal is formed so that a part overlaps the DDR zeolite membrane on the surface thereof" in the aforementioned DDR zeolite membrane element obtained by a method for manufacturing a DDR zeolite membrane element of the present invention.

EXAMPLE

Hereinbelow, the present invention will be described more specifically by Examples. However, the present invention is by no means limited to the Examples.

(Manufacture of DDR Zeolite Powder (Seed Crystal) Dispersion Liquid)

A DDR zeolite powder was manufactured in accordance with a DDR zeolite-manufacturing method described in "M. J. den Exter, J. C. Jansen, H. van Bekkum, Studies in Surface Science and Catalysis vol. 84, Ed. by J. Weitkamp et al., Elsevier (1994) 1159-1166", and the powder was pulverized to obtain a fine powder, which was used as the seed crystals. After the seed crystals after pulverization was dispersed in water, coarse particles are removed to obtain seed crystals dispersion liquid.

Example 1

After putting ethylenediamine (produced by Wako Pure Chemical Industries, Ltd.) of 6.31 g in a fluorine resin bottle, 1-adamanthanamine (produced by Sigma-Aldrich Corporation) of 0.993 g was added thereto to be dissolved lest precipitation of 1-adamanthanamine should remain. Water of 100 g was put in another bottle, and 30 mass % silica sol (Snowtex S produced by Nissan Chemical Industries, Ltd.) of 84.12 g was added thereto. After they were agitated, a solution where ethylenediamine and 1-adamanthanamine were mixed was added, and the mixture was agitated for about one hour to obtain a raw material solution. Then, the raw material solution was transferred to a stainless pressure tight container with a fluorine resin inner cylinder.

The aforementioned seed crystals dispersion liquid was applied on the inner wall surfaces of the through-holes of alumina monolith-shaped substrate (a lotus shaped porous substrate having a diameter of 30 mm, a length of 160 mm, and 37 through-holes having a diameter of 3 mm with the average pore size of the outermost surface layer facing the through-hole being 0.1 µm) by a filtration coat method. The monolith-shaped substrate where the seed crystals adhere to the through-holes was disposed inside the pressure tight container containing the raw material solution. The monolith-shaped substrate having no seal of glass or the like on each of the end portions was used. Then, a heating treatment (hydrothermal synthesis) was performed at 120° C. for 64 hours. After the hydrothermal synthesis, washing with water and drying were performed to obtain a DDR zeolite membrane (containing 1-adamanthanamine) formed on the inner wall surfaces of the monolith-shaped substrate.

Next, a glass paste was applied on both the end faces of the monolith-shaped substrate and the side portions ranging from both the end faces to the positions of 1.5 cm so as to contact the DDR zeolite membrane (containing 1-adamanthanamine). As the glass material for the glass paste, GA-4 (produced by Nippon Electric Glass Co., Ltd., with a softening point of 625° C.) was used. A glass paste was manufactured by dispersing the powdered glass material in a mixed solution of water and polymer.

The DDR zeolite membrane (containing 1-adamanthanamine) where the glass paste was applied was heated up to 650° C. in the air in a furnace to melt the glass and simultaneously burn away 1-adamanthanamine in the pores of the DDR zeolite to obtain a DDR zeolite membrane element.

The crystal phase of the DDR zeolite membrane obtained above was evaluated by inspecting the crystal phase by X-ray diffraction, and only diffraction peaks of the DDR zeolite and the alumina constituting the porous substrate were detected. Incidentally, the "diffraction peak of the DDR zeolite" in the X-ray diffraction is the diffraction peak described in No. 38-651 or 41-571 corresponding with Deca-dodecasil 3R shown in International Center for Diffraction Data (ICDD) "Powder Diffraction File".

Figure 5A:
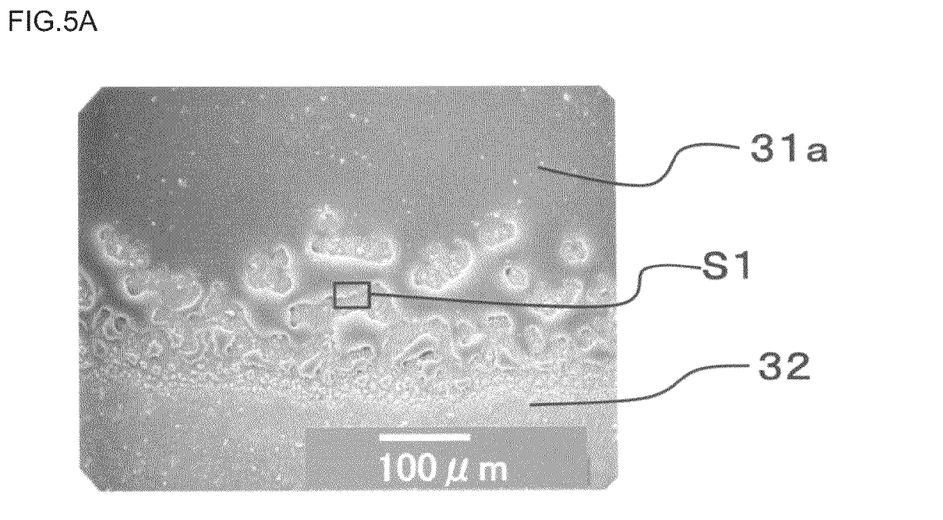
FIG. 5A is an electron micrograph showing a boundary portion between the DDR zeolite membrane and the glass seal of a DDR zeolite membrane element manufactured in Example 1.
Figure 5B:
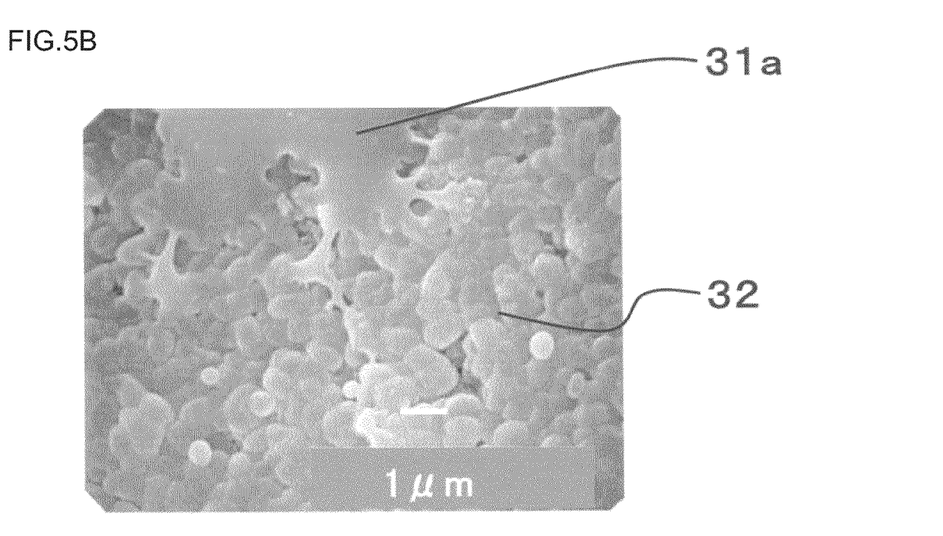
FIG. 5B is an electron micrograph where the region S1 in the electron micrograph of FIG. 5A is enlarged.

Further, the vicinity of the glass seal interface of the DDR zeolite membrane obtained above was observed with an electron microscope to confirm that the DDR zeolite membrane 32 of a polycrystal and the glass seal 31a densely contacted each other. It can be understood from this that sealability of the glass seal 31a becomes good without hindering the formation of the DDR zeolite membrane 32. FIG. 5A and FIG. 5B show electron micrographs.

Example 2

A DDR zeolite membrane (containing 1-adamanthanamine) was obtained by performing the same operations as in Example 1 with using a monolith-shaped substrate having a glass seal applied on the end faces for hydrothermal synthesis. As the material for the glass seal applied on the end faces, $SiO_2$—$Na_2O$ based glass (softening point of 780° C.) was used. Next, a glass paste was applied on the end faces of the monolith-shaped substrate, the side face and the inside of the through-holes in the ranges from the end faces to the positions of 2 cm from the end faces. Then, in the air, it was heated up to 650° C. in an electric furnace to burn away 1-adamanthanamine in the pores of the DDR zeolite to obtain a DDR zeolite membrane element. As the glass paste, the same glass paste as the glass paste used in Example 1 was used.

Comparative Example 1

Figure 6A:
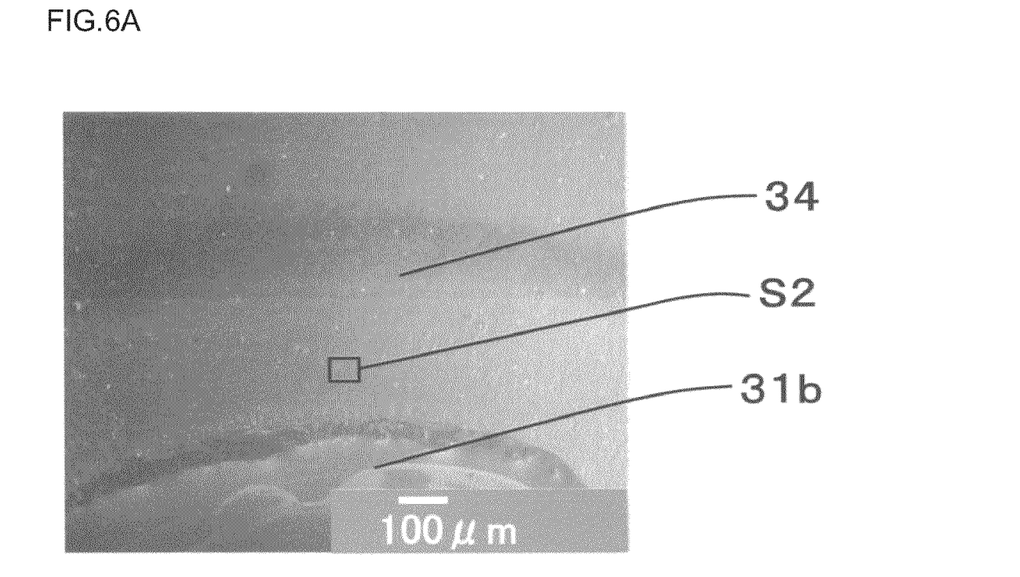
FIG. 6A is an electron micrograph showing a boundary portion between the DDR zeolite membrane and the glass seal of a DDR zeolite membrane element manufactured in Comparative Example 1.
Figure 6B:
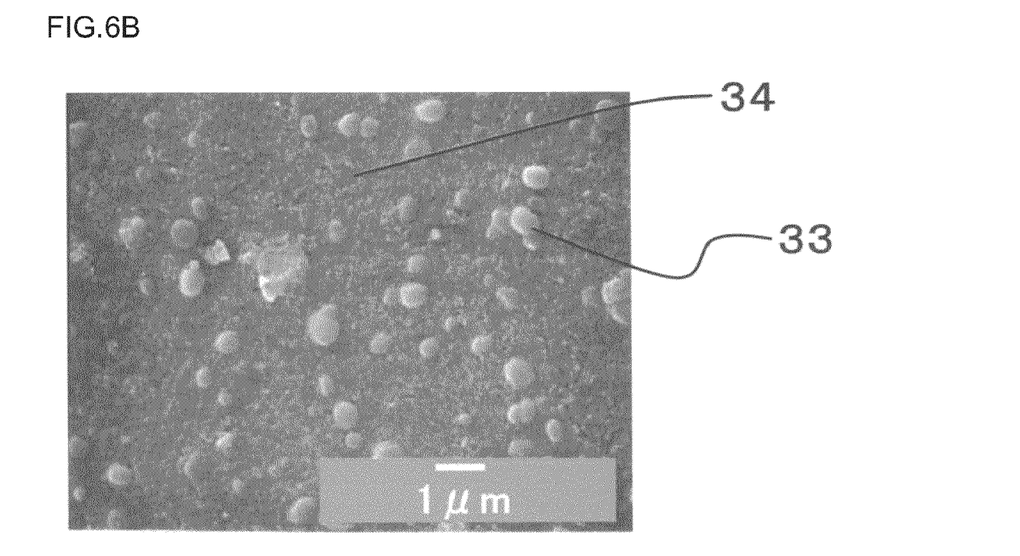
FIG. 6B is an electron micrograph where the region S2 in the electron micrograph of FIG. 6A is enlarged.

With using a monolith support having a glass seal 31b applied in advance on the end faces, the side face, and the inside of the through-holes for hydrothermal synthesis, the same operations as in Example 1 were performed to obtain a DDR zeolite membrane (containing 1-adamanthanamine). As the material for the glass seal applied on the end faces, $SiO_2$—$Na_2O$ based glass (softening point of 780° C.) was used. Then, without applying any glass paste, in the air, it was heated up to 650° C. in an electric furnace to burn away 1-adamanthanamine in the pores of the DDR zeolite to obtain a DDR zeolite membrane. With regard to the DDR zeolite membrane element obtained in Comparative Example 1, in the same manner as in Example 1, the vicinity of the interface between the DDR zeolite membrane and the glass seal was observed with an electron microscope to find that the DDR zeolite membrane of polycrystal and the glass seal did not contact each other and that there was a region where the surface of the monolith-shaped substrate 34 was exposed with the DDR zeolite crystals 33 being present sparsely in the vicinity of the glass seal. It can be understood that this hinders the formation of the DDR zeolite membrane to cause poor seal in the vicinity of the glass seal 31b. FIGS. 6A and 6B show electron micrographs.

Using the DDR zeolite membrane element obtained in Example 1, there was performed a pervaporation test at 70° C. with regard to 94 mass % of ethanol aqueous solution. The water/ethanol separation coefficient showed 45.0. The DDR zeolite membrane element manufactured in Example 1 had high separation performance. Here, the water/ethanol separation coefficient means [water concentration in the liquid which permeated the membrane/ethanol concentration in the liquid which permeated the membrane)]/[water concentration in the liquid supplied to the membrane/ethanol concentration in the liquid supplied to the membrane)]. In addition, the pervaporation test was performed by bringing 94 mass % ethanol aqueous solution into contact with the inner surfaces (supply side) of the through holes of the DDR zeolite membrane element, reducing the pressure on the other surface side (permeation side) of the DDR zeolite membrane element to cause a pressure difference between the supply side and the permeation side, cooling the steam permeated the DDR zeolite membrane element for condensation, and evaluating the amount of the liquid obtained and the composition. Using the DDR zeolite membrane element obtained in Example 2, the pervaporation test was performed in the same manner as in Example 1. The water/ethanol separation coefficient showed 32.8. The DDR zeolite membrane element manufactured in Example 2 had high separation performance. Using the DDR zeolite membrane element obtained in Comparative Example 1, the pervaporation test was performed in the same manner as in Example 1. The water/ethanol separation coefficient showed 2.9. Further, with regard to the DDR zeolite membrane element obtained in Comparative Example 1, after a silicone resin was applied in a portion where poor seal was caused in the vicinity of the glass seal, the pervaporation test was performed. The water/ethanol separation coefficient was improved to 19.8. It can be understood from this that a defect in the vicinity of the glass seal deteriorates the separation performance of the DDR zeolite membrane element to a large extent.

INDUSTRIAL APPLICABILITY

A DDR zeolite membrane element usable for a gas separation membrane or a pervaporation membrane can be manufactured without hindering the formation of the DDR zeolite membrane and without causing poor seal.

The invention claimed is:
1. A method for manufacturing a DDR zeolite membrane element, the method comprising the steps of:
   immersing a porous substrate in a raw material solution containing 1-adamanthanamine, silica, and water,
   forming a DDR zeolite membrane containing 1-adamanthanamine on a surface of the porous substrate by subjecting a DDR zeolite to hydrothermal synthesis in the presence of DDR zeolite seed crystals, applying a glass paste onto the surface of the porous substrate so as to contact the DDR zeolite membrane containing 1-adamanthanamine, and heating the DDR zeolite membrane at 500 to 800° C., thereby burning away the 1-adamanthanamine contained in the DDR zeolite membrane and melting the glass paste to form a membrane-like glass seal contacting the DDR zeolite membrane on the surface of the porous substrate to obtain a DDR zeolite membrane element comprising the porous substrate, the DDR zeolite membrane disposed on the surface of the porous substrate, and the glass seal disposed on the surface of the porous substrate so as to contact the DDR zeolite membrane.

2. A method for manufacturing a DDR zeolite membrane element according to claim 1, wherein the method comprises the steps of:

employing a columnar monolith-shaped substrate having a plurality of through-holes extending through in the central axial direction formed therein as the porous substrate, forming a DDR zeolite membrane containing 1-adamanthanamine on inner wall surfaces of the through-holes of the monolith-shaped substrate by immersing the monolith-shaped substrate in the raw material solution in a state that the DDR zeolite seed crystals are applied on the inner wall surfaces of the through-holes for hydrothermal synthesis, applying a glass paste onto both the end faces of the monolith-shaped substrate so as to contact the DDR zeolite membrane containing 1-adamanthanamine, and heating the DDR zeolite membrane at 500 to 800° C., thereby obtaining a DDR zeolite membrane element comprising the monolith-shaped substrate, the DDR zeolite membrane disposed on the inner wall surfaces of the through-holes of the monolith-shaped substrate, and the glass seal disposed on both the end faces of the monolith-shaped substrate so as to contact the DDR zeolite membrane.

3. A method for manufacturing a DDR zeolite membrane element according to claim 2, wherein a glass paste is applied on both the end faces and on a side face in the range of 1 to 50 mm from each of the end faces of the monolith-shaped substrate so as to contact the DDR zeolite membrane containing 1-adamanthanamine.

4. A method for manufacturing a DDR zeolite membrane element according to claim 2, wherein a glass paste is applied on both the end faces and on the inner wall surfaces of the through-holes in the ranges of 1 to 50 mm from each of the end faces of the monolith-shaped substrate so as to contact the DDR zeolite membrane containing 1-adamanthanamine.

5. A DDR zeolite membrane element made according to the method of claim 1, the DDR zeolite membrane element comprising a porous substrate, a DDR zeolite membrane disposed on a surface of the porous substrate, and a glass seal disposed on a surface of the porous substrate so that a part of the glass seal overlaps the surface of the DDR zeolite membrane.

6. A method for manufacturing a DDR zeolite membrane element according to claim 3, wherein a glass paste is applied on both the end faces and on the inner wall surfaces of the through-holes in the ranges of 1 to 50 mm from each of the end faces of the monolith-shaped substrate so as to contact the DDR zeolite membrane containing 1-adamanthanamine.

* * * * *